United States Patent [19]

Culkin

[11] Patent Number: 4,952,317
[45] Date of Patent: Aug. 28, 1990

[54] DEVICE AND METHOD FOR FILTERING A COLLOIDAL SUSPENSION

[76] Inventor: Bradley Culkin, 1552 Beach St., Ste. P, Oakland, Calif. 94608

[21] Appl. No.: 321,797

[22] Filed: Mar. 10, 1989

[51] Int. Cl.$^5$ .................. B01D 61/18; B01D 61/22
[52] U.S. Cl. ................................... 210/636; 210/648; 210/321.67; 210/321.68
[58] Field of Search .................. 210/321.67, 636, 634, 210/637, 644, 648–650, 787, 788, 791, 257.2, 195.2, 321.67, 321.68, 321.72, 321.78, 321.87

[56] References Cited

U.S. PATENT DOCUMENTS

| | | |
|---|---|---|
| 3,455,821 | 7/1969 | Aremaa .......................... 210/321.67 |
| 3,970,564 | 7/1976 | Shamsutdinov et al. . |
| 4,062,768 | 12/1977 | Elliot . |
| 4,253,962 | 3/1981 | Thompson . |
| 4,446,022 | 5/1984 | Harry . |
| 4,526,688 | 7/1985 | Schmidt, Jr. et al. . |
| 4,545,969 | 10/1985 | Diekotter et al. . |

OTHER PUBLICATIONS

Ultrafiltration Brief—Concentration & Desalting with Immersible CX Ultrafilters Millipore Products Division, Bedford, Mass.; pp. 1–8.

*Primary Examiner*—Frank Sever
*Attorney, Agent, or Firm*—Bielen, Peterson & Lampe

[57] ABSTRACT

A device for separating selected components from a colloidal suspension utilizing a vessel capable of holding the colloidal suspension. A membrane permeable to selected components of a colloidal suspension is sealed over a support to form a leaf element. The leaf element includes an outlet for the selected components of the colloidal suspension and is extended into the colloidal suspension. The leaf element is controllably vibrated and simultaneously with application of a negative or positive pressure which is used to motivate permeation of the membrane by selected components of the colloidal suspension.

30 Claims, 3 Drawing Sheets

U.S. Patent  Aug. 28, 1990  Sheet 1 of 3  4,952,317
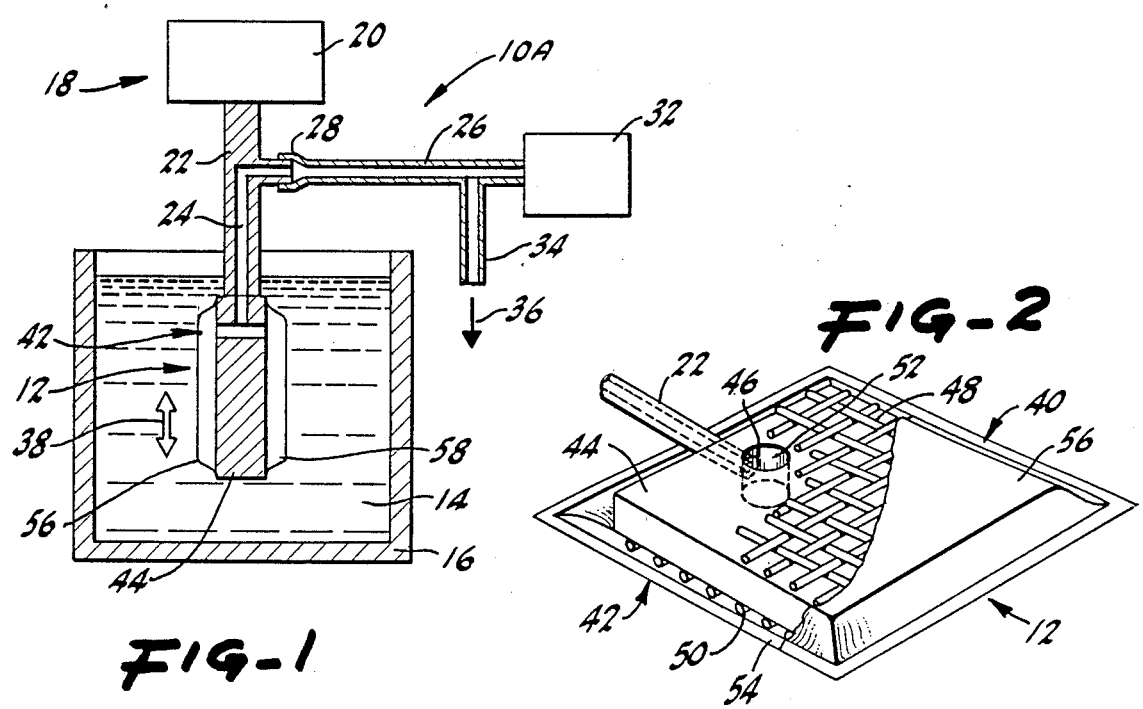
FIG-1
FIG-2
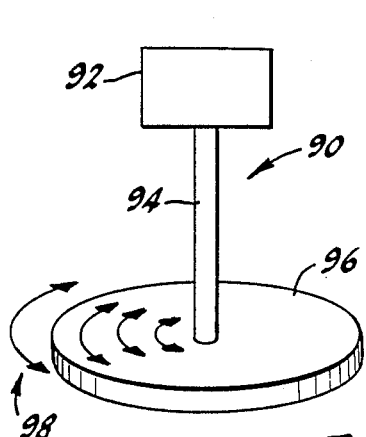
FIG-5
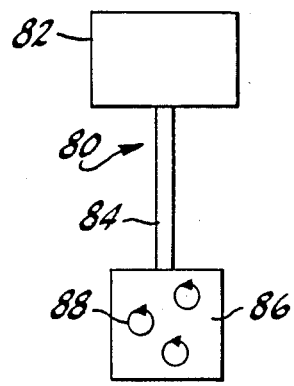
FIG-4
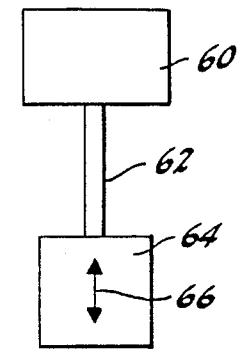
FIG-3
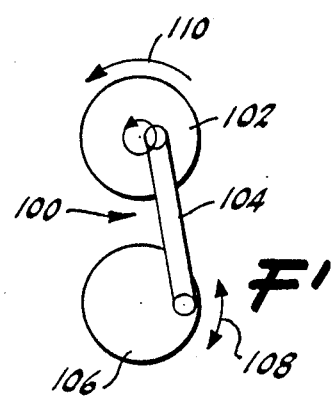
FIG-7
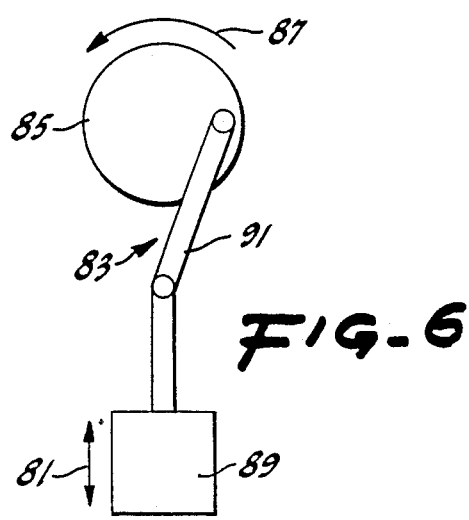
FIG-6

DEVICE AND METHOD FOR FILTERING A COLLOIDAL SUSPENSION

CROSS-REFERENCES TO RELATED APPLICATIONS

The present invention is related to U.S. Pat. No. 4,872,899, issued Oct. 10, 1989.

BACKGROUND OF THE INVENTION

The present invention relates to a novel device and method for separating selected components from colloidal suspensions.

Permeable membranes have been used to separate ions, molecules, and solids from the liquid portion of the colloidal suspension. Although filtration has been employed in this regard there is an ever present problem of plugging or fouling of the filter membrane. Methods of enhancing membrane permeate rates (dewatering rates) are found in the prior art. Such methods include the shearing of liquid slurry across the membrane in tangential flow i.e. crossflow filtration. Such method uses a pump to force the feed slurry to flow tangentially to the dewatering membrane. The resulting sheer causes concentrated material, usually in the form of a filter cake, to be removed from the face of the membrane. Thus, the rate of liquid removal through the membrane is increased. Unfortunately, the provision of pumps to force the feed slurry in this manner requires expensive and bulky equipment and creates serious problems in the sealing of the vessel holding the colloidal suspension.

U.S. Pat. No. 4,253,962 proposes the use of sonic vibration, created by ultrasonic transducers, to produce cavitation at the face of the membrane. U.S. Pat. No. 4,526,688 proposes a shock-type system where the membrane support structure and a filtration apparatus are periodically banged to induce the filter cake to drop from the membrane. U.S. Pat. No. 4,545,969 employs a shearing plate which is oscillated parallel to a fixed membrane. Further, U.S. Pat. No. 3,970,564 teaches a system where a membrane is mechanically vibrated in a direction normal to the membrane. U.S. Pat. Nos. 4,062,768 and 4,446,022 show screening and sieving devices used in dry mineral and wet powder classification in which the screen is vibrated parallel to the face of the screen to induce the powder to fall through the pores of the screen. None of these devices are suitable for separation of the components of a colloidal suspension with the application of a negative or positive pressure vessel.

The CX ultrafilter manufactured by Milipore Products Division of Bedford, Mass. shows a system intended for separating proteins from aqueous solutions. The system utilizes a cylindrical probe which is inserted into a test tube containing the solution to be separated. The cylindrical wall of the probe is formed in part from a membrane material and the proteins pass through the filter from the solution occupying the annular volume between the probe and the test tube wall. The cylindrical probe is reciprocated over a small amplitude (less than 0.01 centimeters) and at 60 Hz. The shear created between the opposed walls of the probe and the test tube is partially effective in reducing plugging of the membrane by the proteins.

In general, the technique of cross-flow microfiltration and ultrafiltration is limited since shear rates above 20,000 sec.$^{-1}$ of intensity are difficult to achieve. Such high intensities require a massive amount of power and the provision of entrance pressures which are uneconomical. Also, such membranes are often arrayed in a rectangular pressure vessel such as a plate and frame cross-flow device. The transmembrane pressure drop is limited by the inherently weak vessel walls.

A membrane filtration device which is able to produce a large shear intensity on the exterior or face of the membrane simultaneously with the application of a large pressure drop across the membrane to create high permeate rates would be a great advance in the art of filtration and component separation.

SUMMARY OF THE INVENTION

In accordance with the present invention a novel and useful method and device for concentrating, dewatering, or separating colloidal and molecular slurries through the use of membrane filtration, is provided.

A colloidal particle is generally defined as a particle possessing a size such that the dominant force influencing the particle motion in a liquid are surface forces; e.g.: surface charge interaction, Van der Wals forces, and the like. This normally occurs below a particle size of 50 microns. Practically, this definition includes finely divided clays, protein molecules, and ions.

The device of the present invention utilizes a vessel capable of holding the colloidal suspension. Such vessel may be a pressure vessel and may be formed into a cylindrical or spherical body. A membrane having interior and exterior surfaces is sealed around a support to form a leaf element. The interior surface of the membrane is connected to the support of the leaf element for movement therewith. The leaf element also includes an outlet for conduction of the selected components of the colloidal suspension permeating the membrane (permeates). Such outlet may be formed as part of the support member. The membrane may also be laminated to a drainage material, such as a open weave cloth, which is placed between the interior surface of the membrane and support.

Means is also included in the present invention for vibrating the leaf element. Such vibrating means include a vibrator and a rod or shaft which is connected to the support of the leaf element. Such rod may be hollow and, thus, conduct the permeates from the interior of the leaf element outwardly from the vessel. Alternatively, the leaf element may be fixed rigidly to a containment vessel and vibration may be applied to both the pressure vessel and the attached leaf element. In many cases, a plurality of leaf elements may be fixed within a pressure vessel and vibrated in this manner. In summary, the vibration in all cases, is applied approximately parallel to the leaf element to produce a shearing between the leaf element and the liquid slurry or colloidal suspension in the vessel.

The leaf element or elements may be single-sided or double-sided. In the latter case, the support within the leaf member would be shaped to accommodate a plurality of faces on the membrane. In this regard, the support may be solid or of open construction i.e. a rigid screen.

Means is also included in the present invention for applying a pressure influence to motivate or to urge permeation of the membrane by the permeates. Such pressure may be in the form of a vacuum communicating with the outlet of the leaf element or leaf elements; in such format the pressure vessel would be open to atmospheric pressure. On the other hand, the vessel may be constructed as a pressure vessel to accept a positive pressure which presses on the slurry or colloidal suspension and, in turn, on the membrane to increase permeate transfer to the interior of the leaf element or elements.

It may be apparent that a novel and useful method and device for separating selective components from colloidal suspensions has been described.

It is therefor an object of the present invention to provide a device and method for separating selected components from a colloidal suspension which produces a very high permeate flow rate.

It is another object of the present invention to provide a device and method for separating selected components from a colloidal suspension which includes a vessel that may be easily sealed for use with negative or positive pressure environments.

Another object of the present invention is to provide a device and method for the separation of selected components from a colloidal suspension which employs means for vibrating the permeable membrane at varying frequencies commensurate with the shear characteristics of the colloidal suspension being separated by the membrane.

Another object of the present invention is to provide a device and method for separating selective components from a colloidal suspension which may employ a plurality of leaf elements in a pressure vessel holding the colloidal suspension.

Yet another object of the present invention is to provide a device and method for separating selected components from a colloidal suspension which substantially improves the filtering rates of colloidal suspensions by preventing plugging of the filter membrane in such filtration process.

Another object of the present invention is to provide a device and method for separation of selected components from a colloidal suspension which employs a vibrator imparting linear, orbital, or torsional motion.

The invention possesses other objects and advantages especially as concerns particular characteristics and features thereof which will become apparent as the specification continues.

BRIEF DESCRIPTION OF THE DRAWINGS

FIG. 1 is a schematic sectional view of a first embodiment of the present invention utilizing a membrane leaf element.

FIG. 2 is a top perspective view with a portion broken away depicting the structure of a membrane leaf element employed in FIG. 1.

FIG. 3 is a schematic view representing the generation of linear vibratory motion.

FIG. 4 is a schematic view representing the generation of orbital vibratory motion.

FIG. 5 is a schematic view representing the generation of torsional vibratory motion.

FIG. 6 is a schematic view illustrating the conversion of flywheel rotary motion to linear vibratory motion.

FIG. 7 is a schematic view representing conversion of flywheel rotary motion to torsional vibratory motion.

Figure 8:
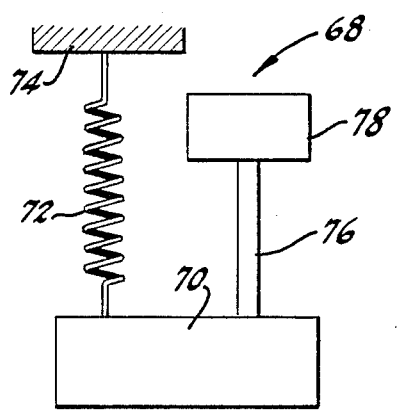
FIG. 8 is a schematic view representing a mechanical linear resonating vibrator.

For a better understanding of the invention reference is made to the following detailed description of the preferred embodiments which should be referenced to the hereinbefore described drawings.

DESCRIPTION OF THE PREFERRED EMBODIMENTS

Various aspects of the present invention will evolve from the following detailed description of the preferred embodiments which should be referenced to the prior described drawings.

The invention as a whole is depicted in the drawings by reference character 10 and an upper case letter, to denote specific embodiments.

With reference to FIG. 1, filter device 10A is depicted. Filter device 10A includes as one of its elements a rectangular leaf element 12, the structure which will be discussed hereinafter. Leaf element 12 is submerged in a slurry or colloidal suspension 14 found in open vessel 16.

Leaf element 12 is vibrated by vibration means 18 which includes a linear vibrator 20 connected to a hollow rigid shaft 22. It should be noted that passageway 24 is employed to remove permeate from colloidal suspension 14. Permeate then passes through flexible tubing 26 having flexible fitting 28 which is linked to spout 30. Vacuum pump 32 aids in the removal of permeate through conduit 34, per directional arrow 36. It should be apparent that rigid tube 22 serves a dual purpose. The first function is to transmit the vibratory motion from linear vibrator 20 to rectangular leaf element 12 along directional arrow 38. The second function of rigid tube 22 is to serve as a pipe or conduit for permeate entering rectangular leaf element 12.

Turning to FIG. 2, the construction of membrane leaf element 12 is shown in particular detail. Membrane leaf element 12 includes a pair of membrane filters 40 and 42. Colloidal suspension, such as slurry 14, include a wide variety of particulates and molecules suspended in a liquid phase. Such particles may vary in size from ions through proteins and large molecules with a molecular weight of one million or more. The former may be separated by defining membranes 40 and 42 as a reverse osmosis membranes; the latter may be separated by defining membranes 40 and 42 as ultrafiltration membranes. Also, membranes 40 and 42 may take the form of microfiltration membranes to filter colloidal particles up to fifty microns in diameter. In general, membranes 40 and 42 are chosen to allow passage of selected components of colloidal suspension 14 i.e. permeate. The liquid phase of colloidal suspension 14 may be aqueous or organic; aqueous being the most commonly encountered liquid phase. In this regard, membranes 40 and 42 may be constructed from a variety of materials depending on the strength, permeate selectivity, pore size, and chemical resistance, required for the particular application. Suitable materials may include natural substances, such as cellulose and natural rubber or polymeric substances such as non-polar polymers, such as polyethylene, polypropylene, polycarbonate, nylon, and the like. Membrane 40 and 42 may also be composed of polar polymers such as polyamides or inorganic substances such as sintered glass and ceramics. Moreover, sintered metal and chemically etched screens may also be used as a material for membranes 40 and 42. Membranes 40 and 42 are sealed or laminated to each other over support or plate 44. Support 44 may be constructed of a relatively rigid plastic material, metal, or other suitable materials. Support 44 is sufficiently rigid to transmit the vibratory forces generated by vibrator 20, FIG. 1, and carried along tube 22. Support 44 includes a bore 46 which accepts rigid tube 22. Tube 22 is glued, welded, or otherwise attached to support 44 through bore 46. In addition, leaf element 12 may include a pair of layers 48 and 50 of open weave cloth which may be laminated between membranes 40 and 42 and support 44. It should be noted that permeate migrating through membranes 40 and 42 also migrates through layers 48 and 50. Bore 46 terminates in an opening 52 in support 44 which communicates with both sides of support 44 adjacent layers 48 and 50. Opening 52 serves as a collection mouth for tube 22. It should be noted that the heretofore described lamination of parts of rectangular leaf element 12 may be accomplished along edge 54 by the use of adhesive, glues, welding, and any suitable technique. In essence, leaf element 12 is a unitary body such that the outer faces or surfaces 56 and 58 of rectangular leaf element vibrates with support member 44.

Although the motion inparted to leaf element 12 in FIGS. 1 and 2 is designated as being linear, such vibration may be orbital, or torsional. FIGS. 3-8 represents the generation of this variety of vibratory motions. FIG. 3 depicts a linear vibrator 60 imparting linear vibratory motion along shaft 62 to a body 64 according to directional arrows 66. FIG. 8 represents an electromechanical linear resonator 68. In such rendition, a mass 70 to be vibrated is connected to compression spring 72 which is fixed to a relatively immobile seismic mass 74. Rigid shaft 76 connects mass 70 to a linear motor 78 which forces mass 70 to vibrate at the resonant frequency of the spring-seismic mass 72, 74 system. FIG. 6 depicts another method of producing linear vibration according to directional arrow 81. In this case, a linear motion generator 83 is depicted employing a flywheel 85 which rotates according directional arrow 87. Rotary motion of flywheel 85 is transmitted to mass or body 89 via double pivoting linkage 91.

Further, FIG. 4 depicts an orbital vibration generator 80 which utilizes an orbital vibrator 82, passing such vibration through rigid shaft 84 to body 86. Directional arrows 88 represent the orbital vibration imparted thereby.

Figure 9:
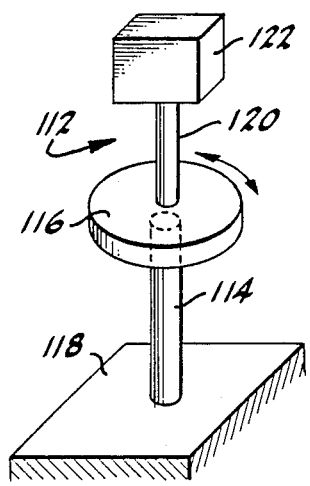
FIG. 9 is a schematic view of a mechanical resonating torsional vibrator.

FIG. 5 shows a generator of torsional motion or vibration 90 employing a torsional vibrator 92 which transmits such vibration along a torsion shaft 94 to a disk 96. Disk 96 vibrates according to directional arrows 98. Turning to FIG. 7 a mechanical engine 100 is depicted to convert the rotary motion of a flywheel 102 along shaft 104 to a body 106. Directional arrow 108 represents the eventual torsional motion generated by flywheel 102 which moves according to directional arrow 110. FIG. 9 depicts an electro-mechanical torsional resonator 112 in which a torsion spring 114 is connected to a disc-shaped mass or body 116. Torsion spring is 114 is fixed to a relatively immovable seismic mass 118. Body 116 is linked to the shaft 120 of a permanent magnet motor 122. It should be noted that motor 122 is driven by a A.C. electrical current at the natural frequency of the torsional spring-mass 114, 118 system. It should also be pointed out that mass or bodies 64, 86, 96, 89, 106, 70, and 116, may schematically represent leaf element 12. Thus, any of the vibrational systems depicted in FIGS. 3-9 may be employed in the present invention 10.

Moreover, the force transducers (vibrators) schematically illustrated in FIGS. 3-9 are generally of at least two types: mechanical engines, and spring-mass resonators. The former produces a reciprocating motion by an arm attached through a bearing through a rim of a rotating flywheel. In the latter, the body to be vibrated is connected to a spring whose size and stiffness are chosen to create a mechanical resonation with the desired resonant frequency and safe deflection amplitude. In either case, the system 10 of the present invention provides a high shear intensity on the faces 56 and 58 of membranes 40 and 42. It should be noted that in certain cases only a single membrane may be used to form a leaf element. The details of the mechanics of such resonation will be discussed hereinafter.

Figure 10:
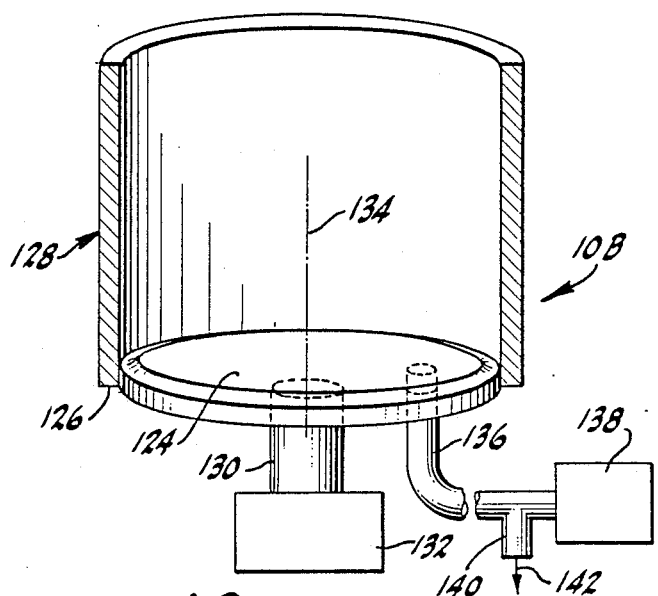
FIG. 10 is a top perspective view with a portion broken away illustrating a second embodiment of the present invention.

Turning to FIG. 10, another embodiment 10B of the present invention is depicted. Device 10B includes a membrane leaf element 124 which is placed at the bottom 126 of a cylindrical vessel 128. Vessel 128 takes the form of a Buchner funnel type of filtration apparatus. Membrane leaf element 124 and vessel 128 are attached to shaft 130 which is driven by torsional vibrator 132. As disk-shaped leaf element 124 and vessel 128 move in torsional vibration about the axis 134 of shaft 130, permeate is removed through vacuum port 136 by the pressure motivation afforded by vacuum pump 138. Permeate passes through spout 140 per directional arrow 142.

Figure 11:
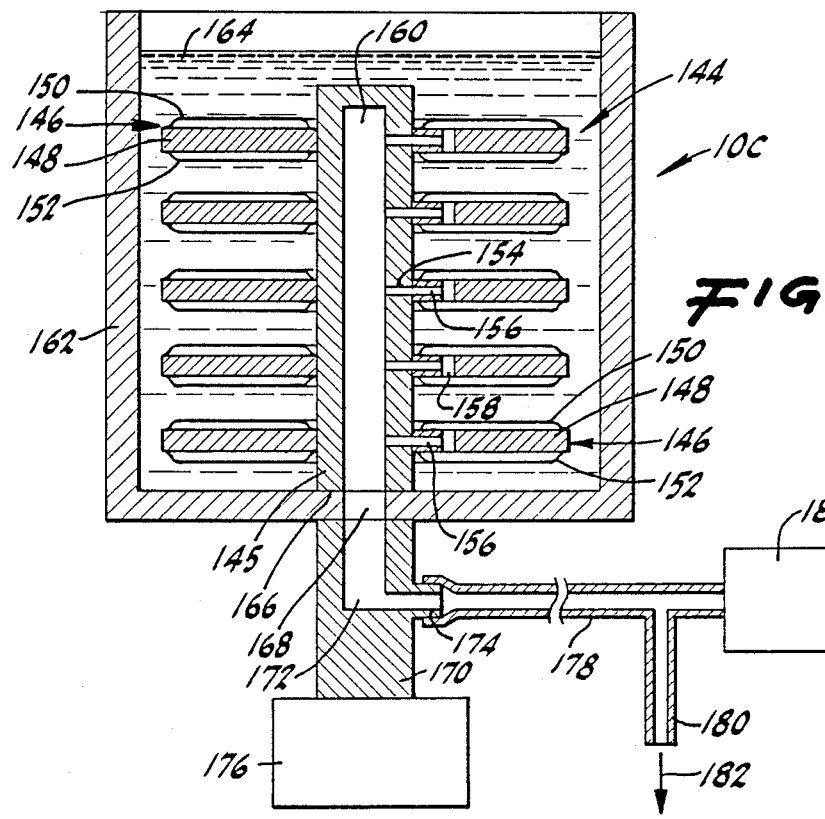
FIG. 11 is an axial sectional view of a third embodiment of the present invention utilizing multiple membrane leaf elements.

FIG. 11 shows embodiment 10C of the present invention in which a plurality of circular leaf elements 144 are connected to a central shaft 145. For example, disk-shaped element 146, similarly constructed to each of the plurality of leaf elements 144, includes a support structure 148 and a pair of membranes 150 and 152 laminated thereto. A shaft 154 possesses a passageway 156 which conducts permeate from opening 158 through support 148. Passageway 156 leads to a central passage 160 through shaft 145. Plurality of circular disk leaf elements 144 are each connected to central shaft 145 inside a cylindrical vessel 162. A slurry or colloidal suspension 164 is poured inside vessel 162 to contact plurality of leaf elements 144. It should be noted that shaft 145 is rigidly attached to cylindrical vessel 162 at the base 166 by suitable fastening means such as welding, gluing, and the like. Of course, such attachment of 145 to vessel 162 would seal the escape of slurry 164 through opening 168 in vessel 162. Cylindrical vessel 162 is also connected to rigid drive shaft 170. Drive shaft 170 includes an L-shaped passageway 172 which exits shaft 170 at nipple 174. Shaft 170 is driven by torsional vibrator 176. Flexible tube 178 sealingly engages nipple 174 to complete the path of permeate from slurry 164 to outlet 180 according to directional arrow 182. In other words, vacuum pump 185 aids in the withdrawal of permeate from slurry 164 from open vessel 162, through central passage 160 of shaft 145, opening 168 in vessel 162, passage 172 of drive shaft 170, and through flexible tube 178 to outlet 180.

Figure 13:
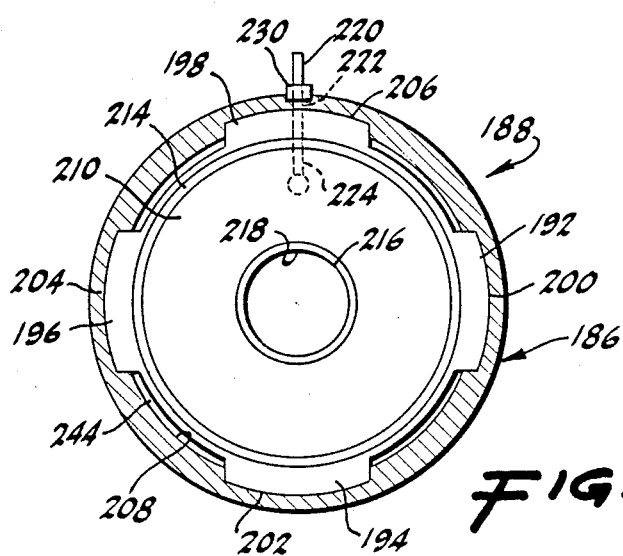
FIG. 13 is a sectional taken along line 13—13 of FIG. 12.
Figure 12:
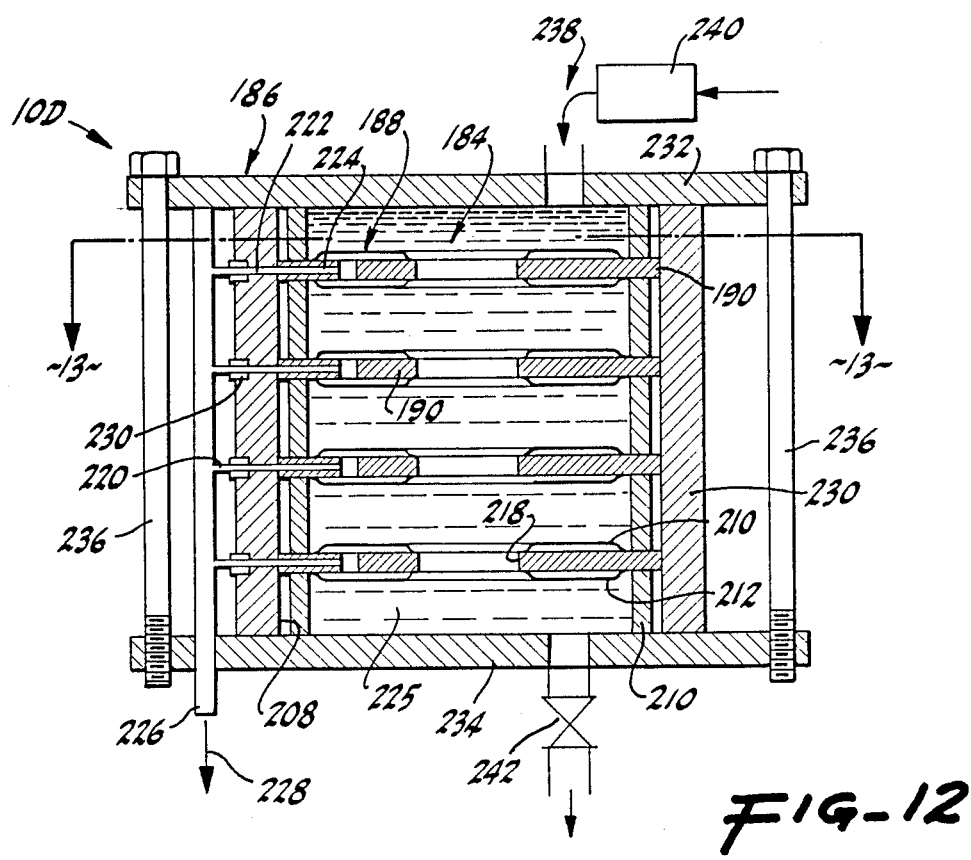
FIG. 12 is an axial sectional view of a fourth embodiment of the present invention utilizing multiple membrane leaf elements.

With reference to FIG. 12, another embodiment 10D of the present invention is depicted in which a plurality of disc-shaped leaf elements 184 are shown inside a cylindrical pressure vessel 186. With reference to FIG. 13, a detail of disc-shaped leaf element 188 is depicted. The support member 190 periphery terminates in a quartet of tabs 192, 194, 196, and 198. Each of the tabs engage a corresponding groove, such as grooves 200, 202, 204, and 206, which are machined into the side wall 208 of pressure vessel 186. A cylindrical support member 210 found within pressure vessel 186 permits the pre-stacking of plurality of leaf elements 184 to assure accurate fitting of the same within pressure vessel 186. Returning to FIG. 13, it may be seen that leaf element 188 is shaped as an annulus with a pair of membranes 210 and 212 heat sealed to outside rim 214 and inside rim 216 surrounding opening 218. It should be noted that membrane 212 is sealed in the same manner to the side opposite that shown in FIG. 13 of leaf element 184. Permeate removal tube 220 is inserted within leaf element 184 via opening 222 through pressure vessel 186 and passage 224 through support member 190. Permeate from slurry or colloidal suspension 224 exits through tube 220 and passes to manifold 226 according to directional arrow 228. Pressure type bushing 230 seals any leakage through passage 222 outside of pressure vessel 186. The plurality of leaf elements 184 are similarly constructed to leaf element 188.

Returning to FIG. 12, it may be observed that pressure vessel 186 is formed of a cylindrical body 230 and a pair of plates 232 and 234. A multiplicity of long bolts 236 extend from top plate 232 to bottom plate 234, where threading engagement occurs. Means 238 for pressure motivating the separation of slurry 225 may takes the form of a positive pressure pump which applies pressure to slurry 225 and eventually to plurality of leaf elements 184. Bleed valve 242 permits the removal of concentrated material from pressure vessel 186. With reference to FIG. 13 it should be noted that each of the plurality of leaf elements 184 includes a gap 244 which permits circulation of slurry 225 within plurality of leaf elements 184. Of course, slurry 225 does not extend into the grooves machined into pressure vessel 186 to engage a quartet of tabs found in each of the plurality of leaf elements 184.

Figure 14:
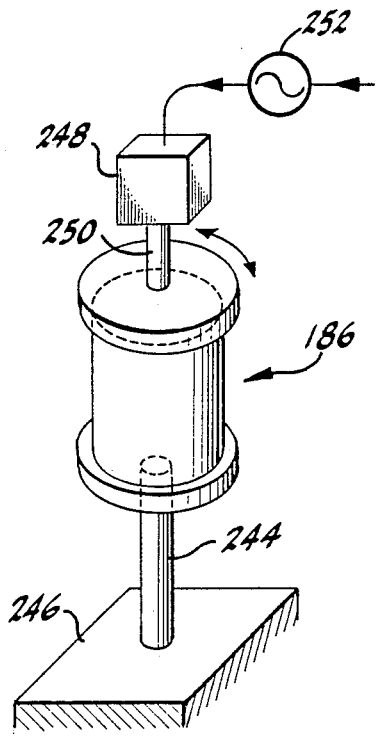
FIG. 14 is a schematic view depicting the operation of the fourth embodiment depicted in FIGS. 12 and 13.

Turning to FIG. 14, the pressure vessel 186 is schematically depicted, and is assumed to contain plurality of stacked leaf elements 184 as detailed in FIGS. 12 and 13. Pressure vessel 186 attaches to a torsion spring 244 which is itself rigidly attached to a large seismic mass 246. Torsional force transducer 248, which may be a brushless permanent magnet motor having a low inertia rotor, attaches to the top of pressure vessel 186 via shaft 250. Alternating current from source 252 drives force transducer 248 at the natural frequency of the torsional resonating system created by the heretofore described elements. It should be noted that torsional spring 244 may be a coil spring, torsion bar, or similar torsion spring element.

In operation, each of the embodiments of the present invention 10A, 10B, 10C and 10D are vibrated by vibration means such as linear vibrator 20, torsional vibrator 132, torsional vibrator 176, and torsional force transducer 248, respectively. Respective leaf element or elements permit permeate to flow from each slurry containing vessel. In certain cases the flow of permeate is motivated by pressure means such as a vacuum pump or a positive pressure pump. For example, in embodiments 10C and 10D, vacuum pump 185 and positive pressure pump 240 are used respectively in this way.

Each separation system of the present invention provides a high shear intensity on the outer surface or faces of the leaf element membranes without resort to cross-flow pumping of the colloidal suspension or slurry held in a particular vessel. Vibration may be induced in both the membrane leaf elements and the surrounding pressure vessel. For example, in embodiments 10C and 10D, a simultaneous application of high shearing and high transmembrane negative or positive pressure can be achieved. As an example, vibration frequencies of about 70 hertz (Hz), with a displacement amplitude of 10 centimeters peak to peak, in combination with a transmembrane pressure drop of several hundred PSI have been produced by using a steel pressure vessel mounted to a torsion spring. The resulting higher permeate flow rate is achieved at an lower cost than cross flow systems. It is believed that the device and method employed in the present invention will produce shear intensities on the particular membrane leaf elements greatly in excess of those typically achieved by cross-flow devices or any of the vibrating filtration devices described in the prior art. It has been found that the particular vibration induced on the leaf element produces the same motion of liquid on the face or outer surface of the membrane leaf element being employed. In this regard, vibration is always applied to cause shearing between the membrane and the slurry or colloidal suspension in which the membrane is immersed. Vibration is therefore applied tangentially to the face or outer surface of a particular leaf element. Liquid contacting the face of the membrane moves at exactly the velocity of the membrane due to the no-slip boundary conditions obeyed by all liquids. As one travels away from the face or outer surface of the membrane, fluid velocity amplitude decays exponentially as the envelope of a propagating shear wave. The decay length for the shear wave velocity amplitude may be expressed as follows:

$$L_s = (\mu/\rho\, \omega)^{\frac{1}{2}}$$

where $\mu$ is the slurry viscosity, $\rho$ is the slurry density and $\omega$ is the frequency of vibration in radians per second.

It should be noted that where the frequency of vibration f is expressed in Hz then $\omega = 2\pi f$ Within 3 or 4 decay lengths, (typically a fraction of a millimeter), the shear intensity is essentially zero. At this point the liquid is stationary. If the vibratory motion of the membrane leaf element is sinusoidal, the velocity of the membrane surface ($\mu$) can be written as:

$$\mu \sim \delta\omega \sin \omega t$$

where $\delta$ is the peak displacement of the membrane leaf away from its average position.

The shear intensity (S) on the face of the membrane can be calculated to be approximately $$S = 157 f^{1.5} \delta$$

in c.g.s. units. Thus, a vibratory filter in which the frequency of vibration is 10 Hz and peak displacement amplitude is 10 centimeters, will produce shearing on the face of the membrane of 49,000 seconds$^{-1}$. Equivalently, a membrane leaf element vibrating at 50 Hz with a displacement amplitude of 1 centimeter would produce a shear intensity of 55,000 sec.$^{-1}$. Many combinations of frequency and displacement amplitude would produce the same level of shearing.

It has been determined experimentally that the permeate rate often increases proportionally to the square root of the shear intensity as defined herein, fixing the transmembrane pressure drop. The permeate rate also increases proportionally to the square root of the transmembrane pressure drop, fixing the shear intensity. If both shear intensity and transmembrane pressure are increased, the permeate rate increases proportional to the square root of the product of shearing times pressure. This implies that the highest permeate rate increase can be achieved by producing, simultaneously, a very intense shearing and a very large transmembrane pressure drop.

Ultimately, the maximum obtainable shear intensity obtainable with the present invention depends to a large degree in strength of material used in constructing the membrane leaf elements. The force acting on the leaf elements is proportional to the acceleration times the mass of the leaf elements:

$$F=ma$$

The peak acceleration is proportional to the frequency squared times the displacement. Thus, force acting on the leaf elements increases proportionally to frequency squared.

In the preferred embodiments, the preferred range of frequency induced by the vibratory devices described hereinabove ranges between 5 Hz and 300 Hz. It has been found that low frequency operation, although producing low "g" forces on the membrane leaf elements requires high displacement amplitudes. In certain cases such amplitudes may be difficult to control. Also, if the frequency induced on the membrane leaf elements is too low, the distances between parallel leaf elements stacked as depicted in FIGS. 11 and 12 must be increased. In other words, the zone of shear must be allowed to extend a greater distance from the outer surface or face of the membranes of the membrane leaf elements. It has also been found that increasing the frequencies of the embodiments depicted in the drawings produces a rather small increase shear intensity and a rather large increase in "g" forces above a frequency of 300 Hz. However, other materials and arrangements may extend the heretofore described perferred frequency range. Nethertheless, for the embodiments depicted, normal operation would take place between 20 Hz and 150 Hz. The low end of this range, at or about 20 Hz, may be employed to separate low viscosity slurries, especially those which are sensitive to shear, such as cellular suspensions. Conversly, the high end of the range, at or about 150 Hz, may be used to separate molecules in ultrafiltration and reverse osmosis applications. Also, such higher frequency may be employed to produce very high shear intensities in non-shear sensitive materials having high viscosity, such as in an application known as microfiltration of mineral clays. Commonly, the operating frequency of the preferred embodiments may range between 40 Hz and 70 Hz.

Likewise, the displacement amplitude of the vibration induced in any of the systems above described may be varied depending on whether the materials to be filtered are shear sensitive. Many living cells and molecules of biological importance are sensitive to shearing. In this case, the vibration displacement amplitude and/or operating frequency would have to be limited to produce a shearing of less than 10,000–20,000 second$^{-1}$. Non-shear sensitive material such a mineral clays can be processed at very high shear intensities of 500,000 second$^{-1}$ or more. It is particularly advantageous in such application to simultaneously apply high shearing intensity and high transmembrane pressure to achieve a very high permeate flow rate.

In general, the method and devices described above improved the filtering of colloidal suspensions by avoiding the plugging of the filter membrane. It is believed that applying a rigorous shear flow at the interface between the filter and membrane and the suspension removes the concentrated polarization layer primarily responsible for plugging of the filter membrane.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A device for separating selected components from a colloidal suspension formed of solid particles and liquids, comprising:
    a. a vessel capable of holding the colloidal suspension;
    b. a membrane having an exterior surface and an interior surface, said membrane being permeable to the selected components of the colloidal suspension;
    c. a support mounted at the interior surface of said membrane and sealed within said membrane, said membrane and support member forming a leaf element, said leaf element extending into the colloidal suspension within said vessel, said leaf element further including an outlet for passage of the selected components of the colloidal suspension permeating said membrane;
    d. means for vibrating said leaf element tangentially along the exterior surface of said membrane to induce shearing between said exterior surface of said membrane and the colloidal suspension; and
    e. means for applying a pressure to motivate permeation of said membrane by said selected components of the colloidal suspension.

2. The device of claim 1 in which said means for applying a pressure comprises a vacuum source acting on said outlet of said leaf element.

3. The device of claim 1 in which said means for applying a pressure comprises a positive pressure source acting on the exterior surface of said membrane.

4. The device of claim 1 in which said means for vibrating said leaf element comprises a member linked to said support, said member being further connected to a vibrator.

5. The device of claim 4 in which said member is a hollow body having a passage and communicating with the outlet of said leaf element for conducting said selected components permeating said membrane.

6. The device of claim 4 in which said vibrator is a linear vibrator.

7. The device of claim 4 in which said vibrator is an orbital vibrator.

8. The device of claim 4 in which said vibrator is a torsional vibrator.

9. The device of claim 8 in which said torsional vibrator includes.

a. a torsion spring mechanically linked to said leaft element.

b. a seismic mass, said torsion spring also being mechanically linked to said seismic mass.

c. a motor having a shaft, said motor shaft being mechanically linked to said leaf element; and d. means for electrically driving said motor.

10. The device of claim 9 in which said leaf element comprises a plurality of leaf elements mounted in said vessel and said torsion spring and said motor shaft are mechanically linked to said vessel.

11. The device of claim 1 in which said means for vibrating said leaf element induces said shearing on said exterior of said membrane to a magnitude of at least 5,000 seconds$^{-1}$.

12. The device of claim 1 in which said means for vibrating said leaf element produces a displacement amplitude of said leaf element of between 5 millimeters and 50 millimeters.

13. The device of claim 1 in which said means for vibrating said leaf element produces a vibration frequency of said leaf element of between 5 Hertz and 300 Hertz.

14. The device of claim 1 in which said means for vibrating said leaf element produces a vibration frequency of said leaf element of between 20 hertz and 100 hertz.

15. The of claim 1 in which said means for vibrating said leaf element produces a vibration frequency of said leaf element of between 40 hertz and 70 hertz.

16. The device of claim 1 in which said means for vibrating said leaf element includes means for vibrating said leaf element and said vessel.

17. The device of claim 1 in which said leaf element includes a plurality of leaf elements each attached to said pressure vessel in spaced configuration, each of said plurality of leaf elements possessing an outlet for the selected components of the colloidal suspension permeating said membrane, each of said outlets communicating with a common conduit extending to the exterior of the vessel.

18. The device of claim 17 in which each of said leaf elements are supported by the vessel.

19. The device of claim 18 in which means for vibrating said leaf element comprises means for vibrating said plurality of leaf elements and includes a vibrator and a shaft attached to the pressure vessel for vibrating said vessel and said plurality of leaf elements.

20. A method of filtration of selected components from a colloidal suspension comprising the steps of:

a. placing the colloidal suspension in a vessel;

b. immersing a leaf element into the colloidal suspension in said vessel, said leaf element including a membrane having an exterior surface and an interior surface, said membrane being permeable to the selected components of the colloidal suspension, said leaf element further including a support mounted at the interior surface of said membrane and sealed within said membrane;

c. vibrating said leaf element tangentially relative to the exterior surface of the membrane to induce shearing between said exterior surface of said membrane and the colloidal suspension;

d. selectively applying a negative and positive pressure to said leaf element to urge permeation of said membrane by the selected components of the colloidal suspension.

21. The method of claim 20 in which said step of selectively applying a negative and positive pressure to said leaf element includes applying at least a partial vacuum to said outlet of said leaf element.

22. The method of claim 20 in which said step of selectively applying a negative and positive pressure to said leaf element includes applying a positive pressure to said exterior surface of said membrane.

23. The method of claim 20 in which said step of vibrating said leaf element includes the step of linearly vibrating said leaf element.

24. The method of claim 20 in which said step of vibrating said leaf element includes the step of orbitally vibrating said leaf element.

25. The method of claim 20 in which said step of vibrating said leaf element includes the step of torsionally vibrating said leaf element.

26. The method of claim 20 in which said step of vibrating said leaf element to induce shearing on said exterior surface of said membrane induces said shearing to a magnitude of at least 5,000 seconds.

27. The method of claim 20 in which said step of vibrating said leaf element includes the step of producing a displacement amplitude of said leaf member of between 5 millimeters and 50 millimeters.

28. The method of claim 20 in which said step of vibrating said leaf element includes the step of producing a vibration frequency of said leaf element of between 5 Hertz and 300 Hertz.

29. The method of claim 20 in which said step of vibrating said leaf element includes the step of vibrating said leaf element and said vessel.

30. The method of claim 29 in which said step of vibrating said leaf element and said vessel includes the step of vibrating a plurality of leaf elements immersed in the colloidal suspension and vibrating said vessel.

* * * * *